UNITED STATES PATENT OFFICE.

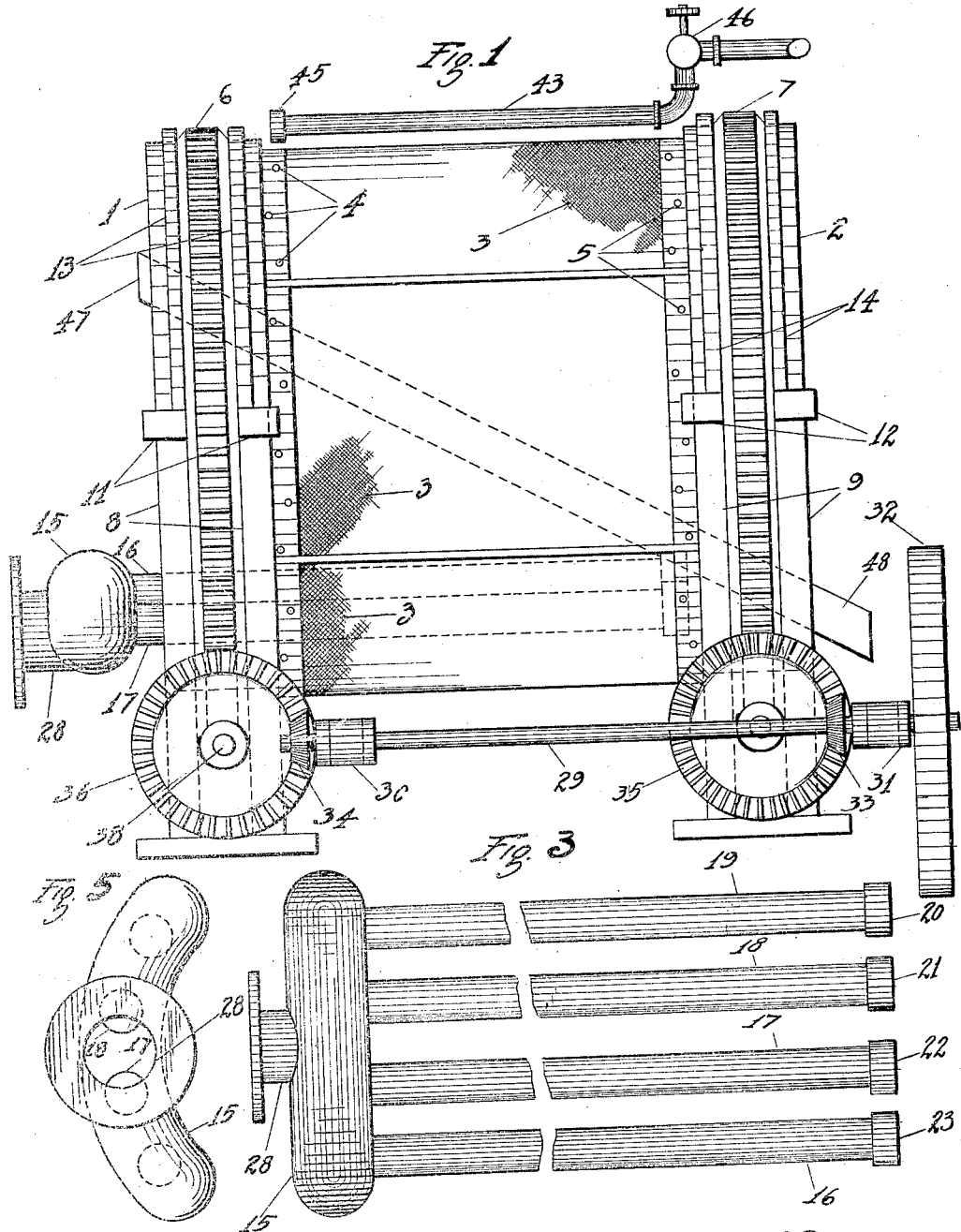

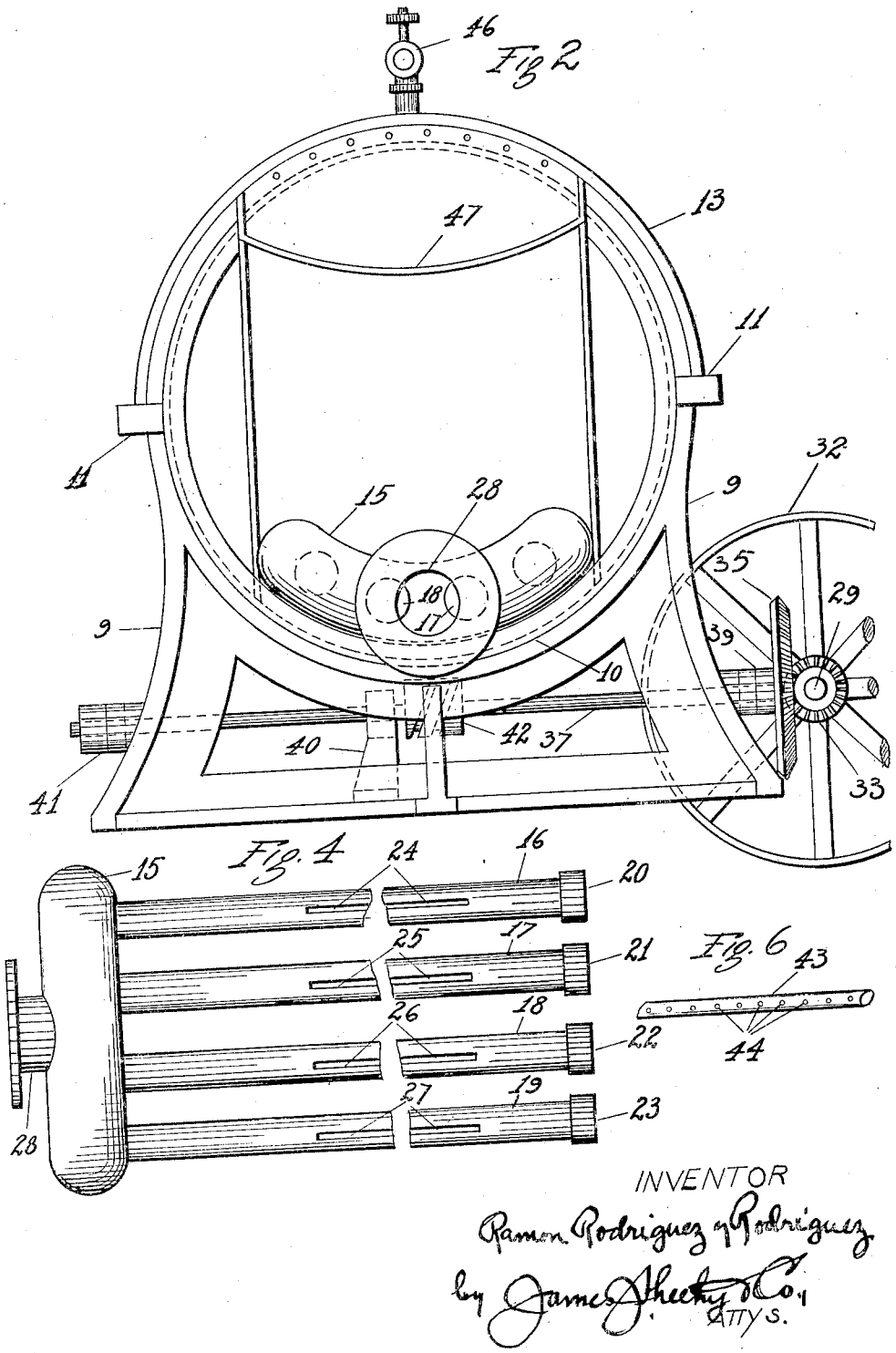

RAMON RODRIGUEZ Y RODRIGUEZ, OF CENTRAL MERCEDES, CUBA.

COLANDER FOR DEFECATED CANE-JUICE.

1,346,060.

Specification of Letters Patent.   Patented July 6, 1920.

Application filed June 28, 1919. Serial No. 307,411.

*To all whom it may concern:*

Be it known that I, RAMON RODRIGUEZ Y RODRIGUEZ, citizen of Cuba, residing at Central Mercedes, in the Province of Matanzas, Cuba, have invented new and useful Improvements in Colanders for Defecated Cane-Juice, of which the following is a specification.

The invention relates to colanders to strain or filter defecated cane juice and has for its main object to provide an apparatus formed of a rotary drum made of metallic mesh which filters the cane juice and in which the cleansing is accomplished in a perfect and efficient way.

An advantage of the invention is the facility to change the mesh, in case of rupture, which occurs very infrequently owing to the fact that the said metallic mesh is not submitted to any unusual strain; the only mission of the mesh being to filter or strain the juice carried to the drum. With these objects in view the invention consists of the details of construction and novel combination of parts, set forth in this specification, illustrated in the accompanying drawings and particularly pointed out in the final claims.

Making reference to the drawings, in which similar characters of reference correspond to identical parts in all the views:

Figure 1, is a lateral view of the colander.

Fig. 2, is an end view, showing the juice collector and distributing tubes.

Fig. 3, is a top view of the collector and tubes.

Fig. 4, is a bottom view of Fig. 3.

Fig. 5, is a front view of the juice collector.

Fig. 6, is a portion of the reticulated tube used to clean the surface of the drum.

1 and 2 indicate cylindrical bands which form the frame of the drum, the metallic mesh 3 being secured to the plates 1 and 2 by means of screws or rivets 4 and 5. To the central portions of the plates 1 and 2 are secured gear wheels 6 and 7 engaging worms as will be explained hereafter.

The drum thus described rests on a pair of double supports 8 and 9, secured to the floor, the interior surface of which is of semi-circular section, so as to correspond to the outer surface of the bands 1 and 2, and serving as surface bearings to them. The gear wheels 6 and 7 rotate respectively within the space formed between the double supports 8 and 9. These carry on their upper ends flanges 11 and 12, to which are secured the semi-circular hoops or bands 13 and 14, which clasp the upper end portions of the drum, and avoid any displacement of the drum, due to rotation.

The cane juice collector 15, is secured to one end of the drum, and is formed of a tube closed at both ends, and is longitudinally curved so as to conform to the curvature of the drum. The distributing tubes 16, 17, 18 and 19, are coupled to the collector 15, and project in a horizontal direction within the drum, being provided on their free ends with stoppers 20, 21, 22 and 23, and with longitudinal grooves 24, 25, 26 and 27 on the portions of the tubes precisely within the drum and above the metallic mesh 3.

The juice penetrates into the collector 15 through a tube 28, coming from the defecating boilers or from some suitable tank. The means to transmit rotary motion to the drums are as follows:

The shaft 29, supported on bearings 30 and 31 carries the wheel 32 on one end, connected with a suitable motor. The pinions 33 and 34 are mounted on the shaft 29, engaging the gear wheels 35 and 36. The shafts 37 and 38 of these wheels are disposed perpendicular relative to the shaft 29, and are mounted on bearings 39, 40 and 41; the worms 42 (one for each shaft 37 and 38) being secured to them and engaging respectively the gear wheels 6 and 7, causing them to rotate.

With the object of cleaning the metallic mesh 3 by separating the bagasse particles adhered onto it, I provide a tube 43, placed above the drum, being reticulated as shown at 44, in Fig. 6 connected to a steam, air or water supply, and being closed at the end 45 as shown in Fig. 1. Said tube is provided with the valve 46 to regulate the entry of the fluid. Being placed very near the surface of the drum the cleansing of the surface is accomplished in a very efficient manner.

The bagasse particles ejected by the fluid fall on an inclined channel 47, diagonally disposed within the drum and secured to the supports 8 and 9. The lower end 48 of the channel 47, projects outside of the drum, from which the bagasse particles may be removed.

The cane juice from the defecating boilers or some suitable tank is taken into the collector 15 and from here into the distributing tubes 16, 17, 18 and 19 and falling through the grooves 24, 25, 26 and 27 into the rotating drum, which strains the said juice and from here falling into a suitable tank placed below the drum, not shown in the drawings. The cleansing operation has been already explained, the bagasse particles falling on the channel from which they may be removed. As it is easily understood the only function of the drum is to strain the juice and the mesh is not submitted to any action or unusual strain to cause rupture or wear.

Having described the nature of my invention, what I claim, is:

1. A colander for defecated cane juice, comprising a drum; a pair of supports for said drum, the upper surfaces of which are of semi-circular section, serving as surface bearings to the drum; flanges secured to the upper ends of the supports and semi-circular hoops or bands secured to the said flanges, which clasp the upper half of the drum and avoid any displacement of same, due to rotation.

2. A colander for defecated cane juice comprising a rotary drum having a straining surface; a cane juice collector, connected to a source of supply, formed of a tube closed at both ends and longitudinally curved so as to conform with the curvature of the drum; distributing tubes coupled to the said collector, projecting in a parallel direction within the drum; said tubes being provided with stoppers at their free ends and with longitudinal grooves in the portions precisely within the drum, from which falls the juice on the straining surface of the drum.

In testimony whereof I have hereunto set my hand.

RAMON RODRIGUEZ Y RODRIGUEZ.